(12) United States Patent  
Chan

(10) Patent No.: US 7,748,402 B2
(45) Date of Patent: Jul. 6, 2010

(54) VALVE ASSEMBLY

(75) Inventor: Yet Chan, Kowloon (HK)

(73) Assignee: Fester Assets Corporation, Hong Kong (HK)

( * ) Notice: Subject to any disclaimer, the term of this patent is extended or adjusted under 35 U.S.C. 154(b) by 0 days.

(21) Appl. No.: 10/976,048

(22) Filed: Oct. 28, 2004

(65) Prior Publication Data

US 2006/0090795 A1    May 4, 2006

(51) Int. Cl.
*F16K 31/18*   (2006.01)

(52) U.S. Cl. ............... 137/422; 137/442; 137/446; 141/198

(58) Field of Classification Search .......... 137/442, 137/446, 422; 141/18, 198
See application file for complete search history.

(56) References Cited

U.S. PATENT DOCUMENTS

| 700,316 | A | * | 5/1902 | Flagg | 137/416 |
| 1,618,331 | A | * | 2/1927 | Gilchrist | 137/422 |
| 1,677,687 | A | * | 7/1928 | Reed | 137/442 |
| 2,177,121 | A | * | 10/1939 | Scott | 137/422 |
| 2,504,638 | A | * | 4/1950 | Browning | 137/420 |
| 3,570,527 | A | * | 3/1971 | Fritz | 137/422 |
| 4,541,464 | A | * | 9/1985 | Christiansen | 137/446 |
| 4,667,711 | A | * | 5/1987 | Draft | 141/198 |
| 5,282,496 | A | * | 2/1994 | Kerger | 141/18 |
| 6,035,888 | A | | 3/2000 | Gil | |
| 6,076,546 | A | * | 6/2000 | Waters | 137/390 |
| 6,079,438 | A | * | 6/2000 | Cavagna | 137/315.08 |
| 6,178,994 | B1 | | 1/2001 | Park | |
| 6,293,302 | B1 | * | 9/2001 | Waters et al. | 137/390 |
| 6,408,869 | B1 | | 6/2002 | Bartos et al. | |
| 6,874,528 | B2 | * | 4/2005 | Kozik et al. | 137/442 |
| 6,910,499 | B2 | * | 6/2005 | Chan | 137/413 |

\* cited by examiner

*Primary Examiner*—Stephen Hepperle
*Assistant Examiner*—Craig Price
(74) *Attorney, Agent, or Firm*—Brooks Kushman P.C.

(57) ABSTRACT

A valve assembly for controlling the filling of a fluid containing vessel is provided having a valve body having a fluid inlet regulated by a valve member movable between an open and closed position within the valve body. A valve controller is provided regulating the valve position having a float pivotally mounted on a float arm and a retaining member pivotally mounted for rotation with the float arm through a limited portion of the float arm range. The retainer member engages the valve member urging it to the open position when the float reaches a predetermined low fill angle and the float arm engages and releases the retainer member when a predetermined high fill level is reached.

12 Claims, 9 Drawing Sheets

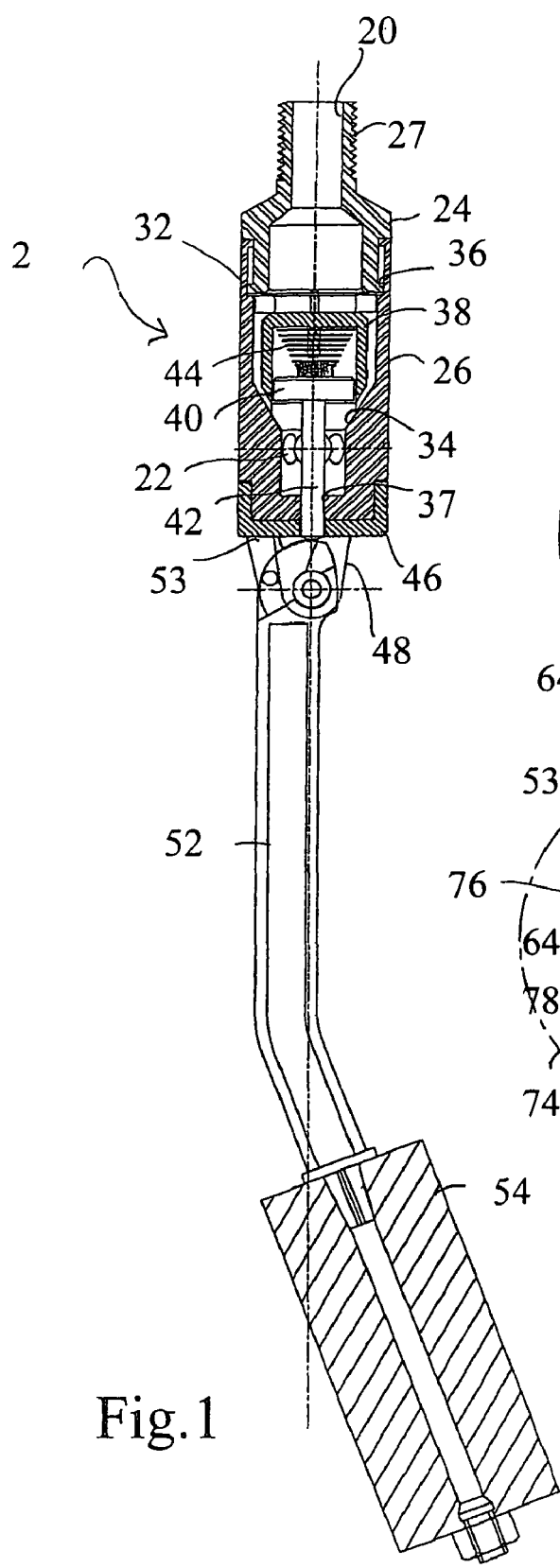
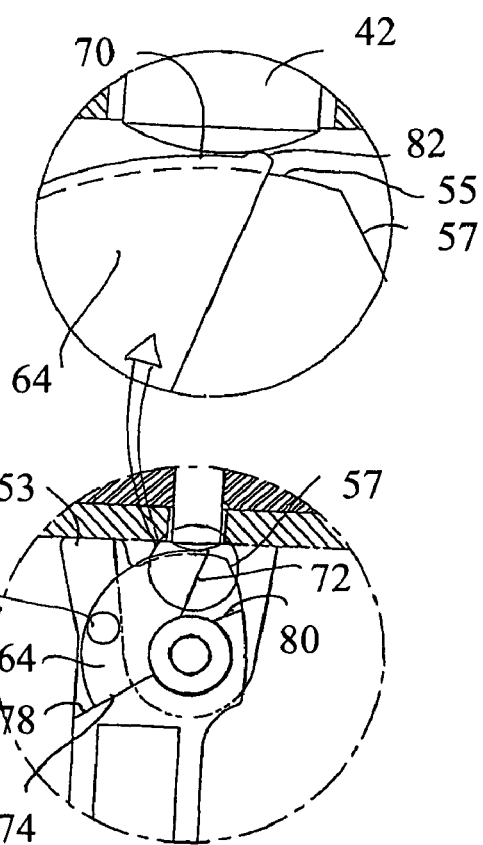
Fig.1B
Fig.1A
Fig.1

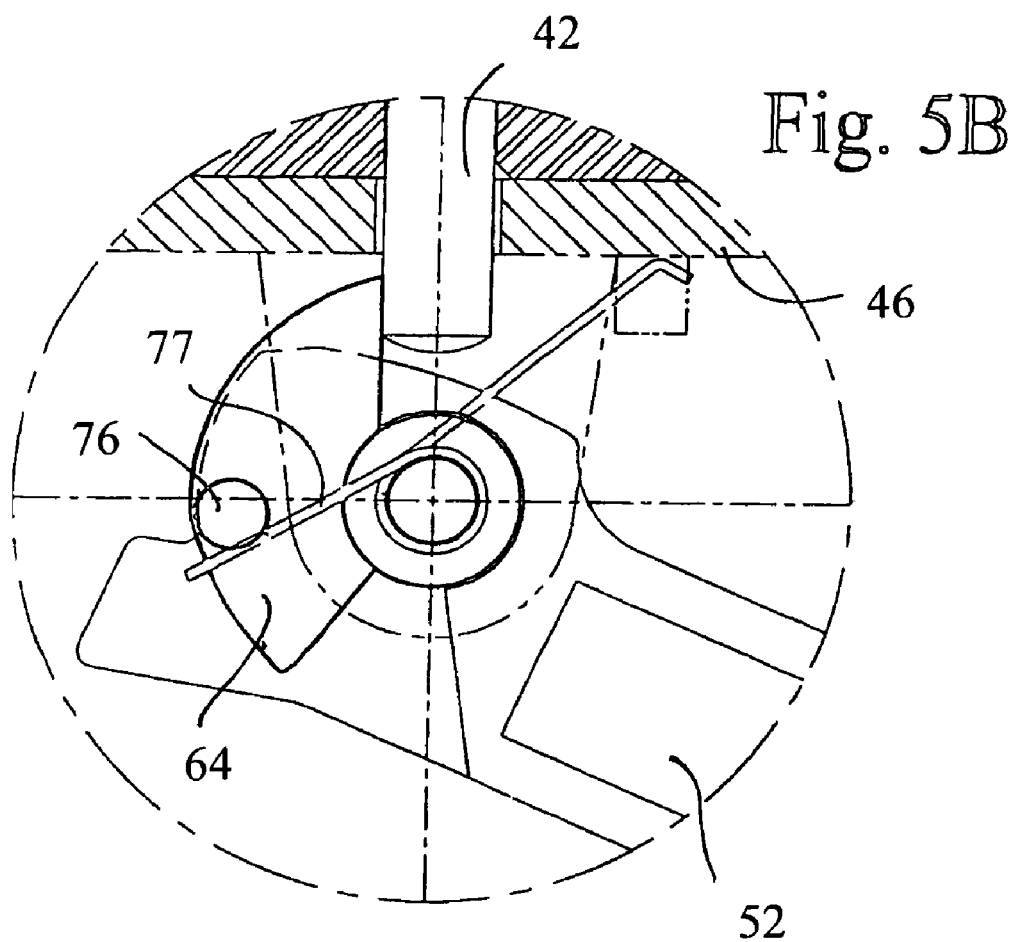

VALVE ASSEMBLY

BACKGROUND OF INVENTION

The invention relates to valve assemblies for fluid-containing vessels, such as pressurized vessels. More particularly, the invention relates to valve assemblies for controlling the filling of such pressurized fluid vessels.

Various valve assemblies constructed to avoid overfilling of pressurized fluid vessels are known. In U.S. Pat. No. 5,282, 496 there is disclosed a two-way valve for filling and draining a gas cylinder. The valve assembly includes a float assembly for control of the opening and closing of the valve as a function of the fluid level in the tank so that the valve can be closed when the fluid level corresponds to the predetermined safe capacity of the vessel.

U.S. Pat. No. 6,076,546 discloses an overflow protection valve assembly in which the valve plunger is separated from the fluid flow to prevent premature closing due to the pressure on the valve plunger.

Applicant's U.S. Pat. No. 6,293,302 discloses a simple valve assembly having a float arm and movable valve body supported on a valve stem disposed to move in and out of a flow path under the action of an actuating member driven by a float which acts directly on a lower end of a valve stem. The valve assembly finds particular applicability for use in liquefied petroleum tanks, such as propane tanks, where it is important from a safety perspective that the tank is not overfilled.

The present invention seeks to provide a further improved valve assembly which provides positive, reliable closure and yet is of simple overall construction.

SUMMARY OF THE INVENTION

In a first aspect the invention resides in a valve assembly for use in fluid-containing vessels for controlling the filling thereof, comprising: a main body having an inlet opening and an outlet opening and defining a fluid flow path therebetween; a movable valve member movable from an open position to a closed position against a valve seat defined in the fluid flow path; valve control means comprising: a float mounted on a pivotably mounted float arm; a retaining member mounted for pivotal movement and driven by the float arm, and having a retaining position at which the valve member is maintained in an open position and out of which the retaining member is driven as the float arm pivots from a lower position to a predetermined angle associated with a predetermined fluid level, at which point the retaining member releases the valve member; and actuating cam means acting on the valve member to move this to an open position as the float arm pivots towards its lower position.

The use of the retaining member driven by the float arm in this manner ensures that relatively small movements of the float arm in say a partly filled container do not have the effect of opening and closing the valve, but rather this opens only when the retaining member is driven out of the retaining position when the vessel is filled. This makes the valve less susceptible to rapid opening/closing as might occur if the tank were shaken from side to side.

In the preferred embodiment the actuating cam means is formed on a surface of the float arm. The float arm is formed with a forward drive surface which abuts said retaining member as the float arm approaches its lower position, whereby the retaining member is driven by the float arm to its retaining position. The float arm is formed with a rear drive surface which abuts the said retaining member, driving it out of the retaining position as said predetermined angle is reached on rising of the float arm.

The retaining member is preferably provided with biasing means which urge it towards the retaining position. It may also be provided with stop means which prevent rotation beyond said retaining position. The retaining member is conveniently disposed to sit in a cut-out in an end region defined of the float arm, said drive surfaces defining at least a portion of the edge of the cut-out, being pivotably mounted for rotation about an axis coincident with the float arm.

The valve member is supported on a valve stem, and end of which is exposed and which is acted on by said actuating cam means and retaining member. The retaining member may be provided with a lip against which the valve stem bears in the retaining position. The valve means is preferably biased to said closed position by resilient means, such as a conical spring.

In an alternative arrangement the actuating cam means comprises a cam surface on the retaining member.

BRIEF INTRODUCTION TO THE DRAWINGS

An embodiment of the invention is now described, by way of example only, with reference to the following drawings in which:

FIG. 1 is a schematic part-sectional view of the valve assembly in accordance with an embodiment of the invention, in an open position;

FIG. 1A shows an enlarged detail of an actuator end of a float arm of FIG. 1;

FIG. 1B shows a further enlarged detail of the view of FIG. 1A showing a retaining member against a lower end of a valve stem;

FIG. 4A is an enlarged detail of the actuator cam and retaining member of FIG. 4;

FIG. 5A is an enlarged detail of the actuator cam and retaining member of FIG. 5;

FIG. 5B is an enlarged detail corresponding to FIG. 5A but where the spring is shown;

DETAILED DESCRIPTION OF PREFERRED EMBODIMENTS

The invention is directed to a valve assembly for use in a pressurized fluid vessel. The valve assembly allows filling of pressurized fluid into the vessel and unloading of the fluid from the vessel through essentially the same fluid flow path, controlled by a valve plunger. Preferred embodiments of the invention are described in the context of a tank for containing liquefied petroleum gas such as propane, such being commonly used in the home, for example for cooking appliances, and for barbecues and grills and the like. It should be understood that the principles of the invention are also applicable to other pressurized vessel environments in which control of the filling level is desired or required.

Figure 8:
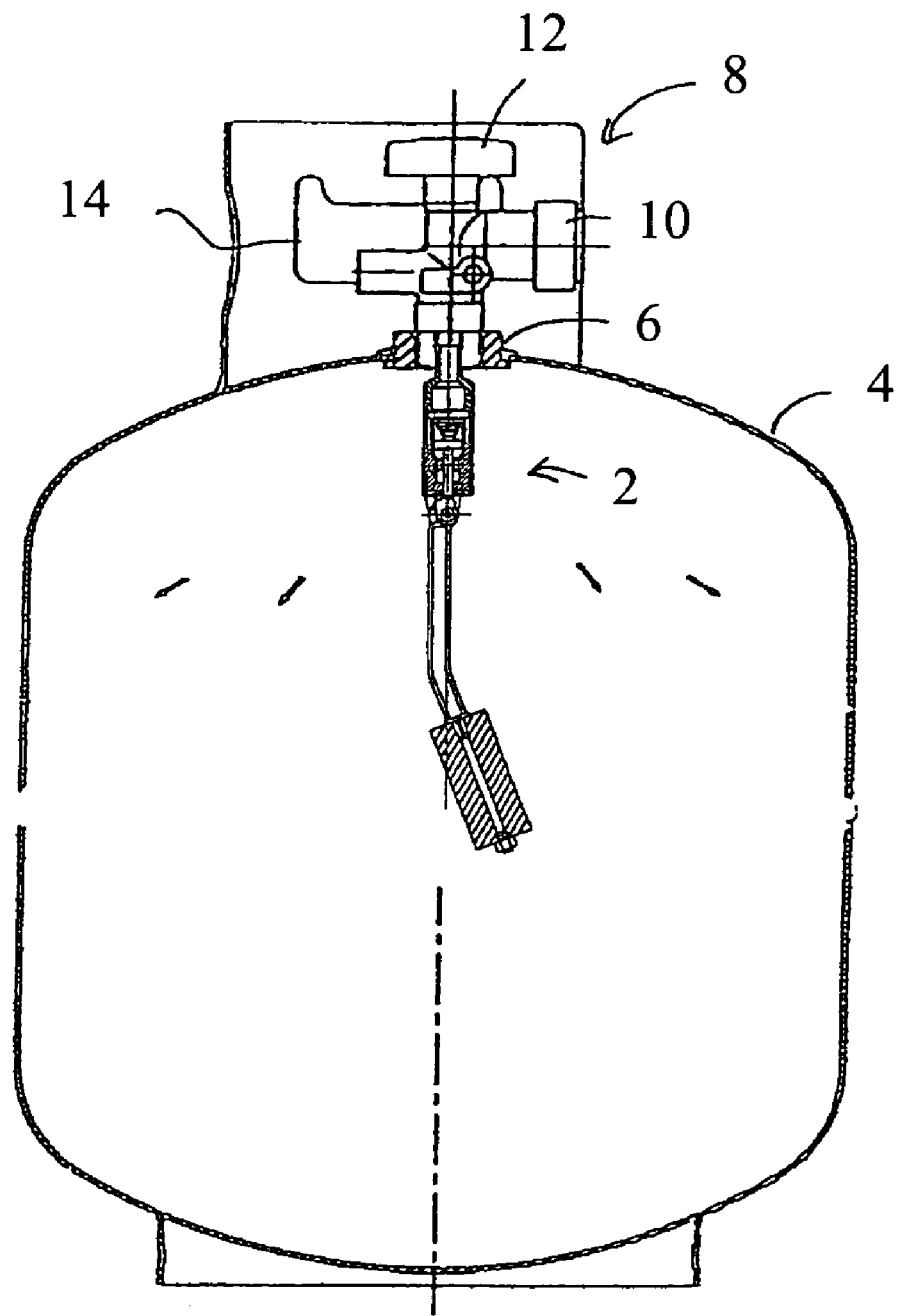
FIG. 8 shows the valve assembly fitted in a vessel which requires filling.

Referring to FIG. 8, a valve assembly 2 is shown installed in a pressurized fluid vessel, such as a propane tank 4. The propane tank 4 includes an opening 6 to which an external valve 8 is secured. The external valve 8 has a port 10 through which pressurized fluid, such as propane, can be supplied to the vessel and through which the fluid can be dispensed for fuelling an appliance (not shown).

Opening and closing of the port can be controlled manually by turning a handle 12, which controls a shut-off valve assembly, not shown but well-known in the art. The external valve 8 can provide a safety valve port 14 for the release of pressurized fluid at a predetermined pressure level, which may be exceeded, for example, if the vessel 4 is overheated.

The external valve 8 can mount to the vessel 4 by a threaded engagement with the opening 6. The external valve 8 can also provide an interior threaded connection for securing to an upper threaded stem of the valve assembly 2. In use, during filling pressurized fluid passes through an upper port in the valve assembly 2 and flows through lower ports out of the valve assembly 2 and into the vessel 4 interior.

Turning to FIG. 1, the valve assembly 2 comprises a main housing having upper and lower housing parts 24, 26 respectively. The upper housing part 24 defines the upper threaded stem 27 and defines the upper port 20. A lower portion defines a male thread 32.

The lower housing part 26 has an elongate form which defines an internal cylindrical opening which includes a frustoconical surface which forms a valve seat 34 communicating with a series of radial ports 22. An upper rim of the lower housing part 26 is internally provided with a female thread 36 whereby upper and lower housing parts can be tightly connected by a screw fit. An axial bore 37 is provided in the lower region of the lower housing part 26.

Disposed within the cylindrical interior cavity of the lower housing part 26 is an insert 38 which has the shape of an inverted cup and which functions as a flow diverter. Its exterior is provided with a number of ribs which serve to space the insert 38 from the interior surface of a main internal cavity of the housing part 26 and defining fluid flow paths therebetween.

Disposed within the open upturned mouth of the flow diverter 38 is a movable valve member 40 which is supported on the end of a valve stem 42 which extends through the lower axial bore 37. A conical spring 44 is arranged between the interior underside of the flow diverter 38 and an upper surface of the valve member 40, so as to impart a downward force against the valve member 40.

Figure 2:
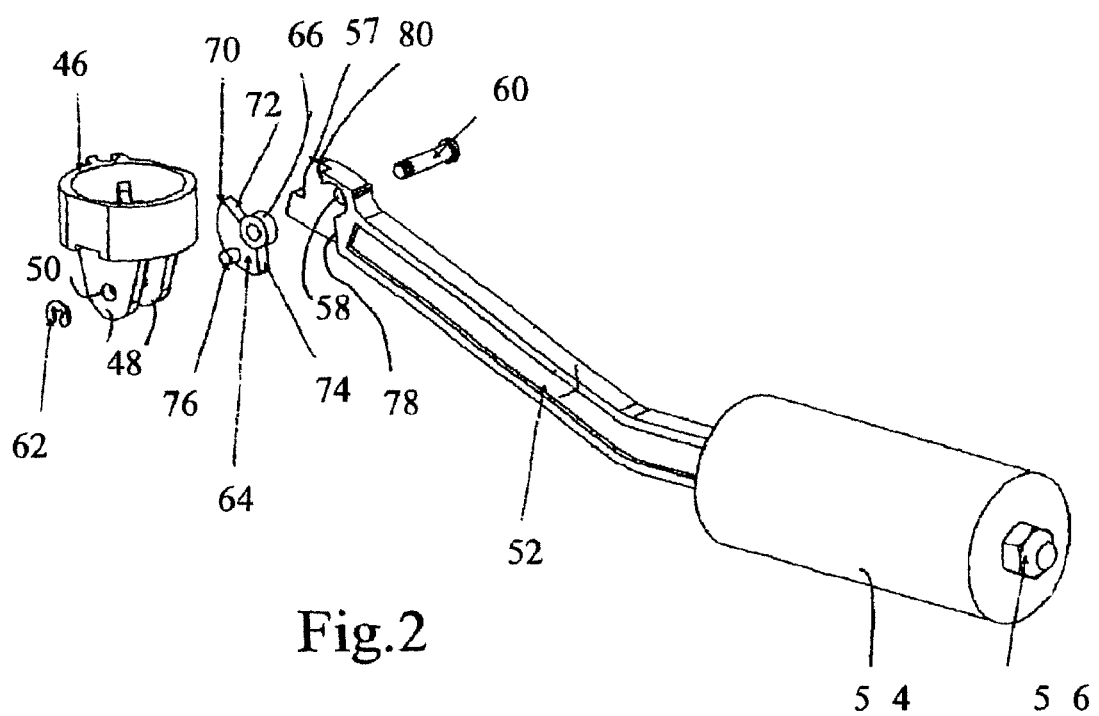
FIG. 2 is an exploded view of an end cap and float arm assembly.

At the base of the lower housing part 26 is an end cap 46 which supports a float assembly which constitutes a control means for controlling the opening and closing of the valve. As best seen in FIG. 2 the end cap 46 has a cup-like form with a pair of parallel depending supports 48 formed with aligned openings 50. The supports 48 carry a float arm 52 which is provided with a float 54 secured to the arm by a stem having a threaded end to which a nut 56 is fitted. More particularly, the proximal end of the float arm 52 has an opening 58, with a pin 60 extending through the openings 50 and 58 with a split ring or "e-ring" 62 fitted to its free end to secure the arm 52.

This proximal end of the arm 52 has a longitudinally-extending extension 53 which constitutes a stop for the arm 52 when it lies in the lowermost position of FIG. 1, the extension 53 abutting beneath the underside of the end cap 46. Adjacent the stop 53 on the surface facing away from the float is a curved region 55 which meets an inclined surface 57 which constitutes a cam surface, best seen in FIGS. 1A and 1B.

Also disposed at the proximal end of the float arm 52 is a retaining member 64 which has the form of a part-circular disc supported a collar 66, subtending an angle of about 140° between opposite edges. The retaining member 64 sits in a cut-out region at the proximal end of the arm 52, with pin 60 extending through an opening in a collar 66 of the retaining member 64, and has an outer curved surface 70, a forward edge constituting a forward abutment surface 72 and a rear edge rear abutment surface 74. A pin-like stop 76 limits rotation of the retaining member 64, abutting one of the supports 48 in the downward most position of the float arm. The retaining member 64 is driven predominantly by forward and rear abutment surfaces 78 and 80 respectively on the float arm 52 adjacent and defining the cut-out region.

Figure 5:
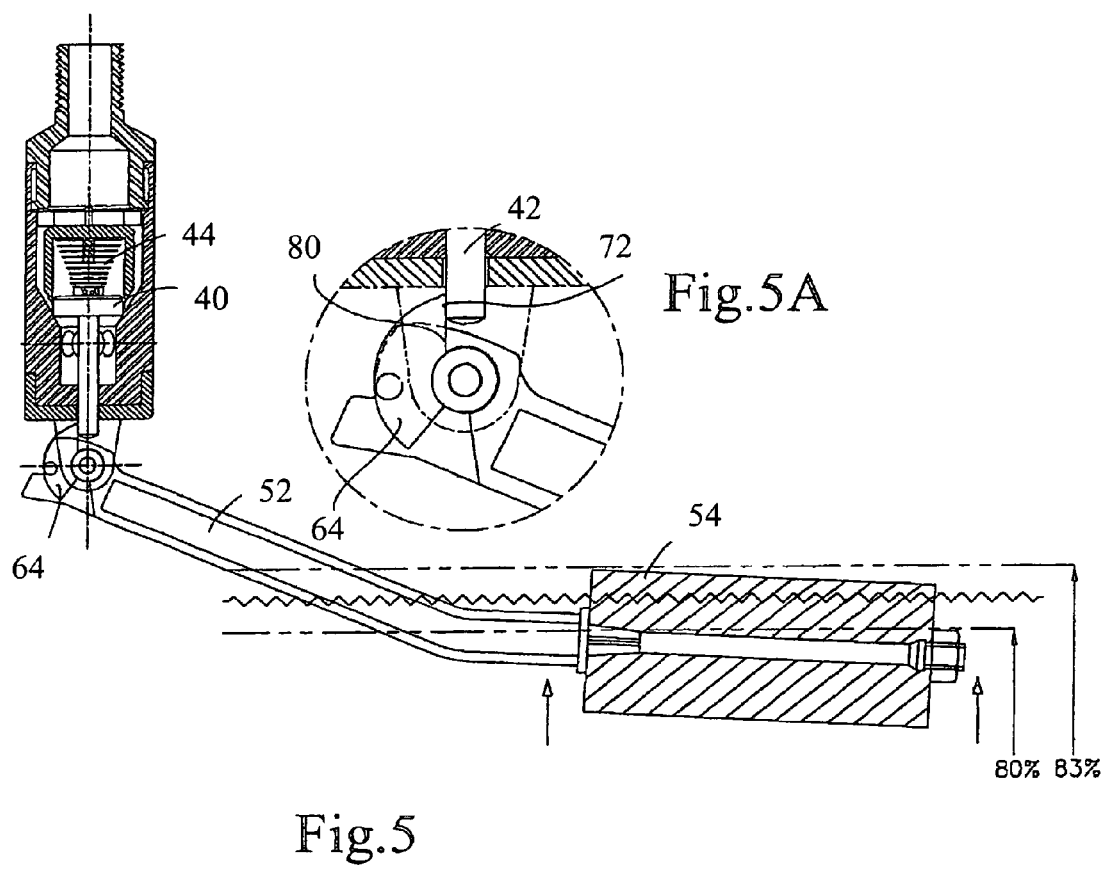
FIG. 5 shows the valve assembly in a full condition with the valve closed.

It may also be arranged that a spring such as leg spring acts on the retaining member 64, for example disposed between the stop 76 and an underside of the end cap, in order to impart a clockwise biasing force on the retaining member. This is omitted from the drawings for reasons of clarity, with the exception of FIG. 5B which shows the spring indicated 77.

The interaction of the retaining member 64 with the adjacent parts of the proximal end of the float arm 52 controls the opening and closing movement of the valve member 40 in a manner as now described with reference to a tank filling operation, and with reference to FIGS. 1 and 3 to 6.

FIG. 1 shows the valve assembly in a condition in which the liquid level in the vessel is beneath the bottom of the float valve 54. In this condition the float arm 52 hangs vertically downward, with its stop 53 abutting the underside of the cap 46, with retaining member 64 driven to a forwardmost (clockwise, as viewed in the Figures) position in which the outer curved surface 70 of the retaining member lying beneath and supporting the lower end of the valve stem 42, ensuring that this is held upwardly. The valve member 40 is spaced from the valve seat 34, whereby the valve is in an open condition. The spring 77 serves to hold the retaining member in this forwardmost position. As can be seen in FIG. 1B the outer curved surface 70 of the follower 64 may have at its forward end a small protrusion 82 which also helps to stably support the end of the valve stem 42 providing a broader platform for the stem end, although it should be noted that this protrusion is not essential. It will also be noted that the curved surface 70 of the retaining member 64 is shown in FIG. 1B to lie slightly higher than the curved surface 55 of the arm 52. This is not essential, and both surfaces might be coincident.

Figure 3A:
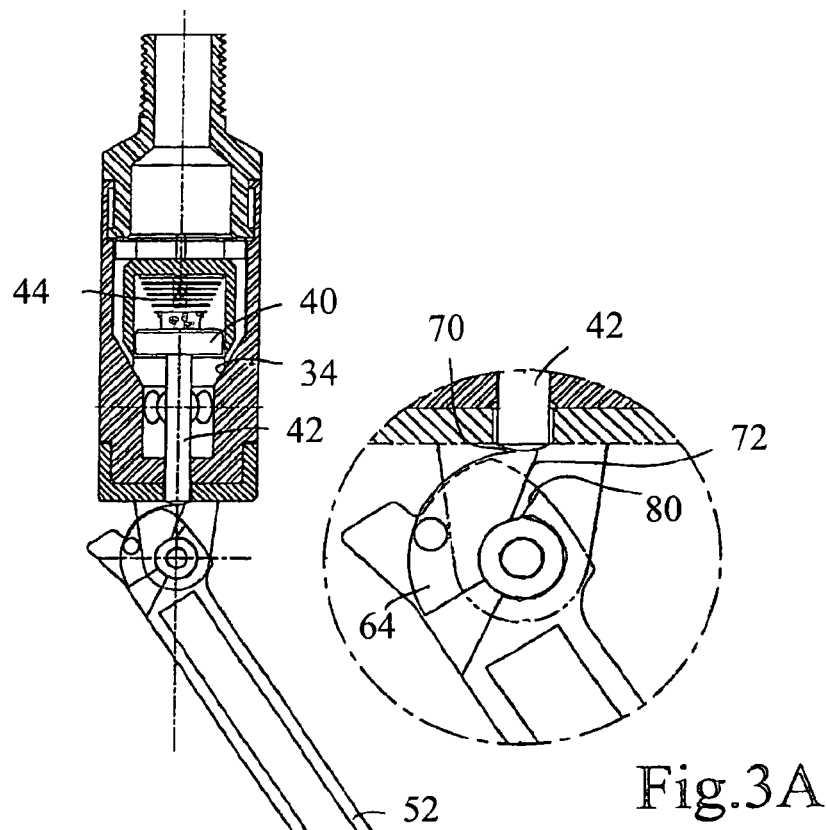
FIG. 3A is an enlarged detail of the actuator cam and retaining member of FIG. 3.
Figure 3:
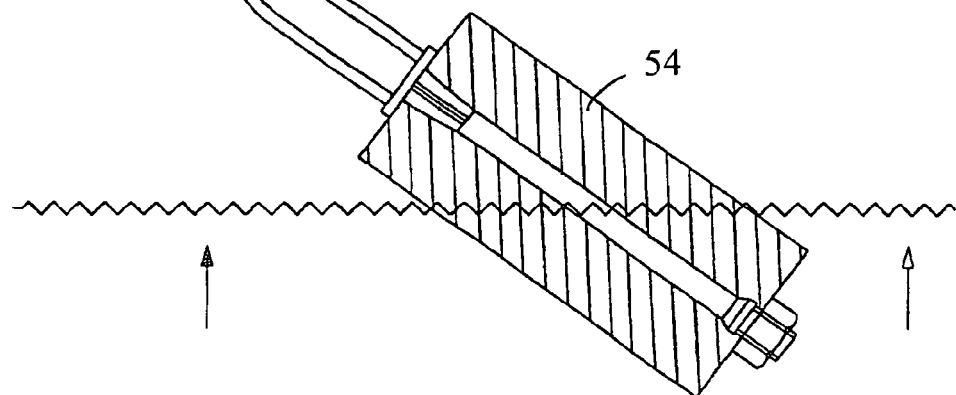
FIG. 3 shows the valve assembly of FIG. 1 in a partly full condition of a fluid-containing vessel.
Figure 4:
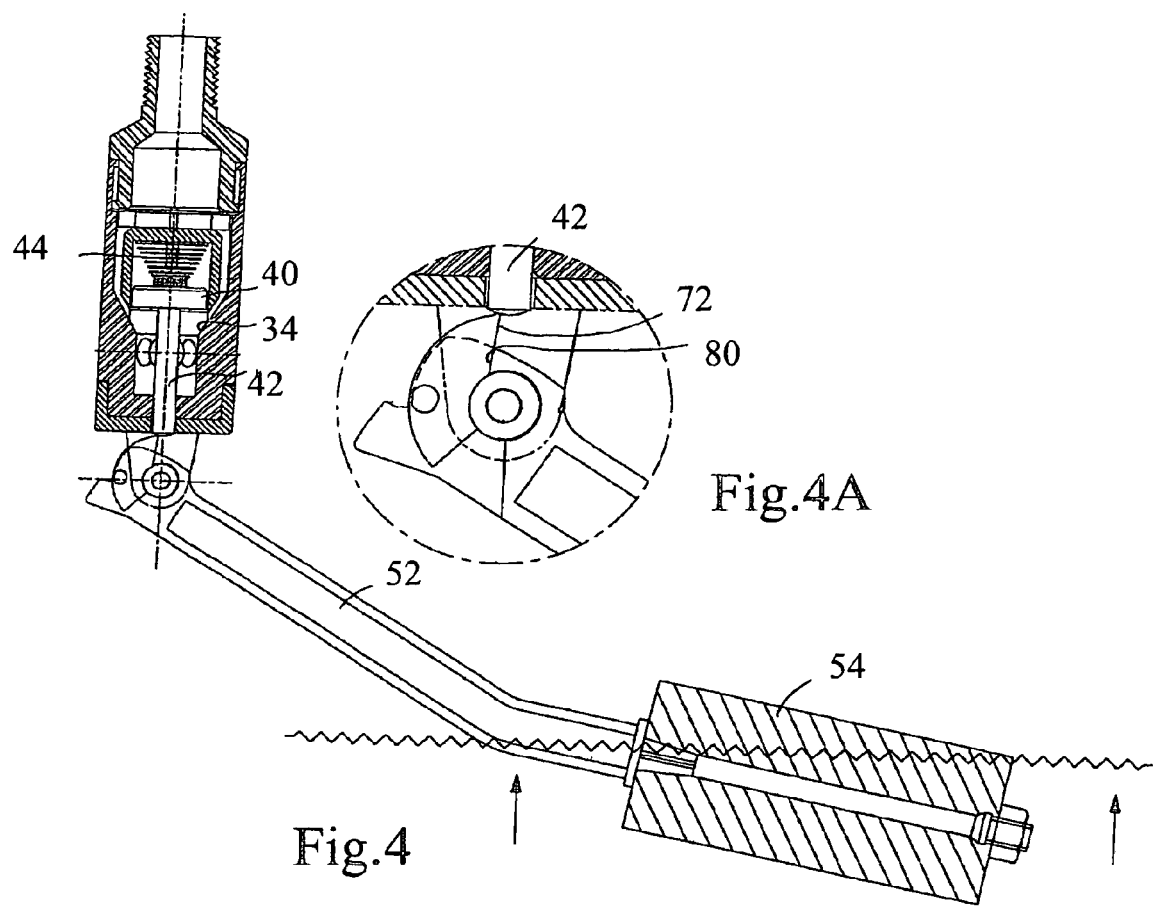
FIG. 4 shows the valve assembly in a further filled condition.

In this empty or part-empty condition if a source of pressurized fluid is fitted to the external valve 8 the fluid will flow down through the upper port 20, around the diverter 38 through the valve clearance and out through the ports 22 into the vessel interior. As the fluid level rises to a sufficient degree to lift the float 54 the arm 52 is caused to rotate in an anti-clockwise sense, as illustrated in FIG. 3. The surface 70 of the retaining member 64 remains under the end of the valve stem 42 supporting this in the uppermost position, any frictional force in a clockwise direction being resisted by the frictional force between the stem end and surface 70, and by the protrusion 82 and/or leg spring. This situation remains on continued filling until the position shown in FIGS. 4 and 4A is reached, at which point the drive surface 80 on the float arm 52 abuts the forward abutment surface 72 causing the retaining member 64 to rotate in the anti-clockwise sense. FIGS. 4 and 4A show the valve still closed (just), but in FIGS. 5 and 5A the surface 70 (and protrusion 82) has just cleared the valve stem 42 whereby this can snap down under the influence of the weight of the valve member and the spring 44 which acts on the valve member 40. The valve member is thereby forced down rapidly against the valve seat 34, closing the valve and preventing overfilling of the tank.

Dispensing of pressurized fluid from the vessel is achieved by opening the external valve 8, the pressure inside the tank being higher than external pressure, and the valve member 40 being pushed up by this pressure difference so that the valve is open for dispensing.

Figures 6, 6A:
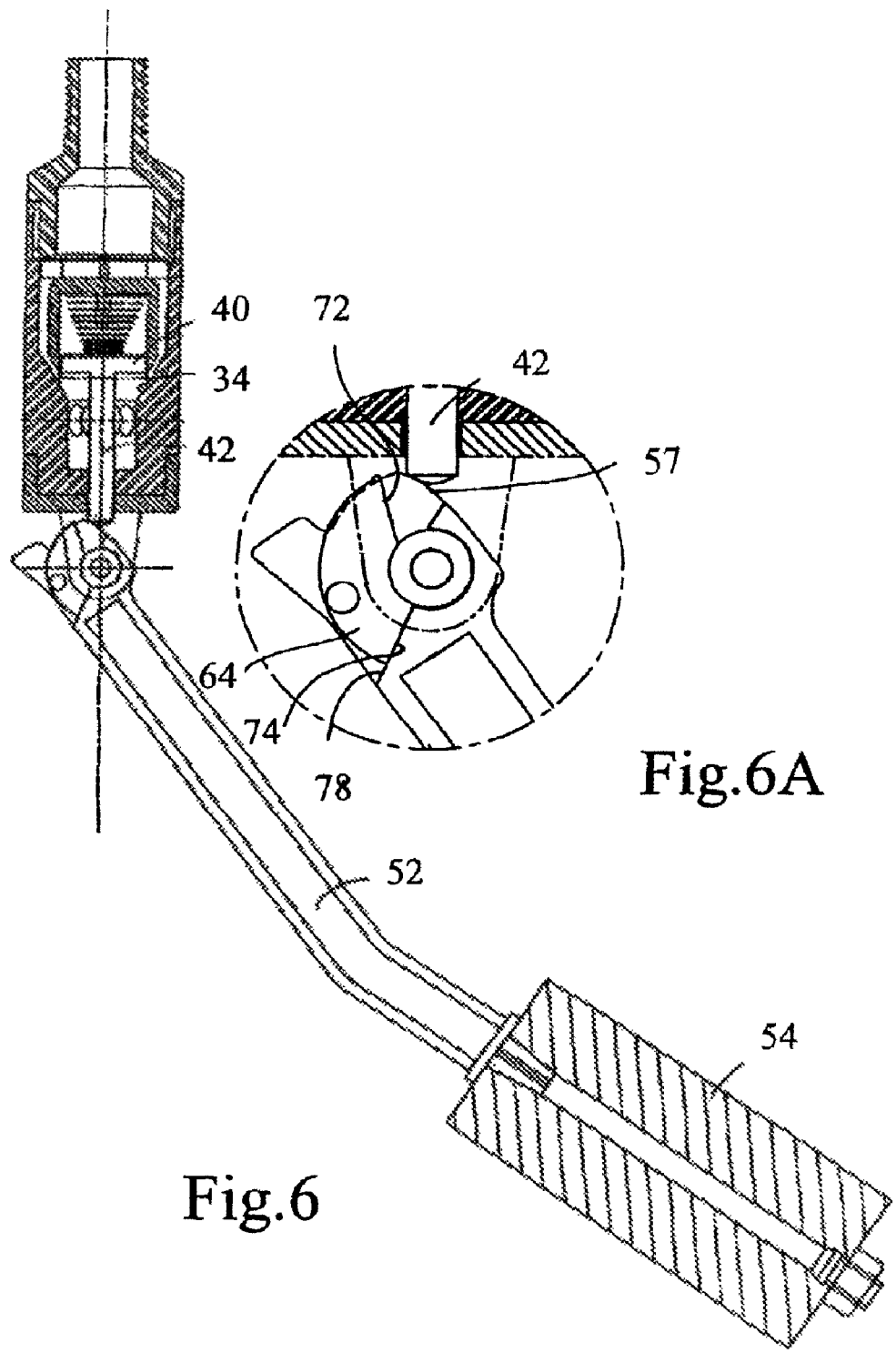
FIG. 6 shows the valve assembly after partial emptying of the vessel with the valve in a partly open condition.
FIG. 6A is an enlarged detail of the actuating cam and retaining member of FIG. 6.
Figures 7, 7A:
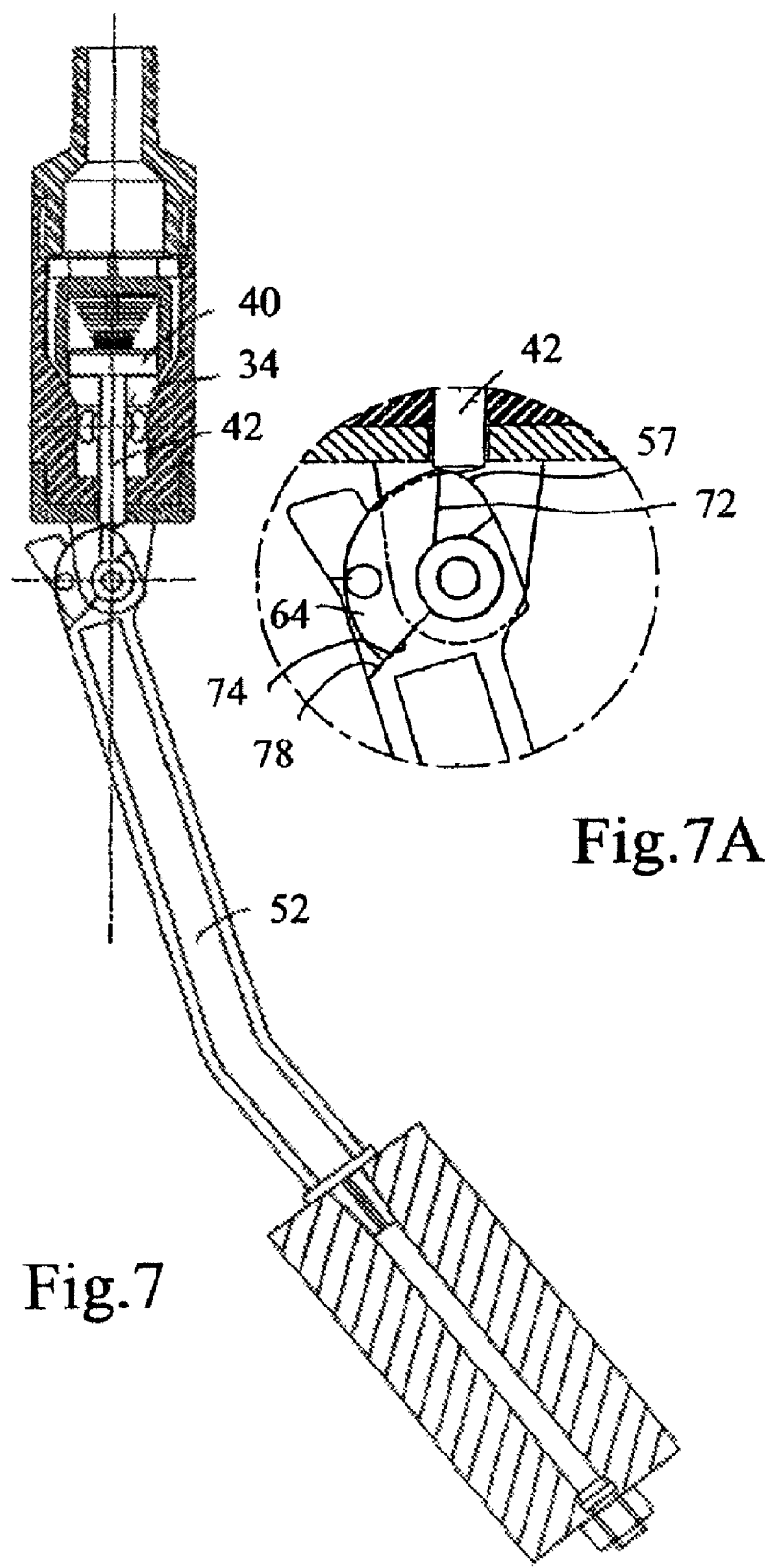
FIG. 7 shows the valve assembly in a further emptied condition of the vessel with the valve fully open.
FIG. 7A is an enlarged detail of the actuator cam and retaining member of FIG. 7.

As the fluid level in the vessel decreases the float and float arm 52 falls. FIGS. 6 and 6A show the valve assembly as the float arm 52 has fallen abut 30.degree. from the FIG. 5 position at which position the cam surface 57 has just engaged beneath the end of the valve stem 42 such that continued downward movement of the float arm 52 causes the cam surface 57 to force the valve stem 42 upwardly. (It will be appreciated however that with suitable adaptation the precise angle at which this engagement occurs can be varied). It is also arranged that at the position where the cam surface 57 engages the valve stem 42, the forward abutment surface 78 of the float arm 52 abuts the surface 74 of the retaining member 64 driving this in a clockwise sense. FIGS. 7 and 7A illustrate the position at which the valve stem 42 is almost fully depressed upwardly. The retaining member 64 has been driven by the abutment surface 78 clockwise, and its forward-most end is just starting to move beneath the valve stem 42.

On continued falling of the fluid level the float 54 moves to its lowermost position with the arm 52 hanging vertically down, as illustrated back in FIGS. 1, 1A and 1B, with the retaining member 64 stably supporting the valve stem 42 and thereby maintaining the valve fully open.

In a further variation, the cam surface may instead be formed on the forward edge of the retaining member and such that the end of the float arm never engages the end of the valve stem, but rather serves only to drive the retaining member in the clockwise and anticlockwise directions, on emptying and filling.

The invention claimed is:

1. A valve assembly for use in fluid-containing vessels for controlling the filling thereof, comprising:
    a main body having an inlet opening and an outlet opening and defining a fluid flow path therebetween;
    a movable valve member movable from an open position to a closed position against a valve seat defined in the fluid flow path and biased towards a closed position by a resilient member; and
    a valve control mechanism having a float attached to a distal end of a float arm which is pivotable about a pivot axis, a retaining member mounted for pivotal movement about the pivot axis and driven by the float arm through a limited portion of the range of float arm rotation, a cam surface acting against the valve member to move it to the open position against said resilient member when the float arm moves to a lowered position and the retaining member being driven by the float arm to a retaining position holding the valve member open when the float arm is moved to the lowered position allowing fluid to enter the vessel, and as the float arm is raised as the vessel fills, the float arm pivots until the float arm travels to a predetermined angle associated with a predetermined high fluid level, at which point the float arm engages and rotates the retaining member to release and close the valve member under the force of said resilient member.

2. A valve assembly according to claim 1 wherein the cam surface is formed on the float arm.

3. A valve assembly according to claim 2 wherein the float arm is formed with a forward drive surface which abuts said retaining member as the float arm approaches its lower position, whereby the retaining member is driven by the float arm to its retaining position.

4. A valve assembly according to claim 3 wherein the float arm is formed with a rear drive surface which abuts the said retaining member, driving it out of the retaining position as said predetermined angle is reached on rising of the float arm.

5. A valve assembly according to claim 4 wherein the retaining member lies in a cut-out in an end region defined of the float arm, said drive surfaces defining at least a portion of the edge of the cut-out.

6. A valve assembly for use in fluid-containing vessels for controlling the filling thereof, comprising:
    a main body having an inlet opening and an outlet opening and defining a fluid flow path therebetween;
    a movable valve member movable from an open position to a closed position against a valve seat defined in the fluid flow path and biased towards a closed position by a resilient member; and
    a valve control mechanism having a float attached to a distal end of a float arm which is pivotable about a pivot axis, a retaining member mounted for pivotal movement about the pivot axis and driven by the float arm through a limited portion of the range of float arm rotation, a cam surface on a proximal end of the float arm acting against the valve member to move it toward the open position against said resilient member when the float arm moves toward a lowered position and the retaining member being driven by the float arm to a retaining position holding the valve member open when the float arm reaches the lowered position allowing fluid to enter the vessel, and as the float arm is raised as the vessel fills, the float arm pivots until the float arm travels to a predetermined angle associated with a predetermined high fluid level, at which point the float arm engages and rotates the retaining member to release and close the valve member under the force of said resilient member.

7. A valve assembly according to claim 6 wherein the retaining member is provided with biasing means which urge it towards the retaining position.

8. A valve assembly according to claim 6 wherein the retaining member is provided with stop means which prevents rotation beyond said retaining position.

9. A valve assembly according to claim 6 wherein the retaining member is pivotably mounted for rotation about an axis coincident with the float arm.

10. A valve assembly according to claim 6 wherein the valve member is supported on a valve stem, an end of which is exposed and which is acted on by said retaining member.

11. A valve assembly according to claim 10 wherein the retaining member is provided with a lip against which the valve stem bears in the retaining position.

12. A valve assembly according to claim 6 where the retaining member is provided with a cam surface on the retaining member periphery to engage the valve member.

* * * * *